US010003108B2

(12) United States Patent
Kajitani

(10) Patent No.: US 10,003,108 B2
(45) Date of Patent: Jun. 19, 2018

(54) STORAGE BATTERY, METHOD OF CONTROLLING STORAGE BATTERY, AND NON-TRANSITORY STORAGE MEDIUM

(71) Applicant: NEC Corporation, Tokyo (JP)

(72) Inventor: Hiroshi Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 68 days.

(21) Appl. No.: 15/034,407

(22) PCT Filed: Nov. 13, 2014

(86) PCT No.: PCT/JP2014/080056
§ 371 (c)(1),
(2) Date: May 4, 2016

(87) PCT Pub. No.: WO2015/072510
PCT Pub. Date: May 21, 2015

(65) Prior Publication Data
US 2016/0276715 A1 Sep. 22, 2016

(30) Foreign Application Priority Data

Nov. 14, 2013 (JP) ................................. 2013-235979

(51) Int. Cl.
H02J 7/00 (2006.01)
H01M 10/42 (2006.01)
(Continued)

(52) U.S. Cl.
CPC ........ *H01M 10/4257* (2013.01); *H01G 11/18* (2013.01); *H01M 10/443* (2013.01);
(Continued)

(58) Field of Classification Search
CPC .................................................. Y02E 60/12
(Continued)

(56) References Cited

U.S. PATENT DOCUMENTS

| 6,061,639 A * | 5/2000 | Wistrand | G01R 31/3624 324/427 |
|---|---|---|---|
| 6,107,779 A * | 8/2000 | Hara | G01R 31/3613 320/132 |
| 6,958,590 B1 * | 10/2005 | Vaananen | H01M 10/46 320/150 |
| 7,675,263 B2 * | 3/2010 | Kawasumi | H01M 2/34 320/110 |
| 2007/0145954 A1 * | 6/2007 | Kawahara | B60L 11/1864 320/150 |

(Continued)

FOREIGN PATENT DOCUMENTS

| JP | H07-031069 A | 1/1995 |
|---|---|---|
| JP | H10-136578 A | 5/1998 |

(Continued)

OTHER PUBLICATIONS

International Search Report, Corresponding to PCT/JP2014/080056, dated Dec. 22, 2014, 3 pp.

*Primary Examiner* — Yalkew Fantu
(74) *Attorney, Agent, or Firm* — Wilmer Cutler Pickering Hale and Dorr LLP

(57) ABSTRACT

A problem to be solved is to realize a reduction of a difference in temperature between battery cells. Provided is a storage battery (10) including an electrical storage unit (20) including a battery cell group having a plurality of battery cells connected in series, a temperature difference detection unit (21) that detects a difference in temperature between the plurality of battery cells, and a charging and discharging control unit (22) that executes control processing of controlling at least one of charging to the electrical storage unit (20) and discharging from the electrical storage unit (20) so that the amount of current flowing in a battery cell having a relatively low temperature among the plurality of battery cells becomes greater than the amount of current flowing in a battery cell having a relatively high temperature among the plurality of battery cells.

9 Claims, 7 Drawing Sheets

(51) Int. Cl.
*H01M 10/44* (2006.01)
*H01M 10/48* (2006.01)
*H01G 11/18* (2013.01)
*H01M 10/46* (2006.01)
*H02J 7/34* (2006.01)

(52) U.S. Cl.
CPC ......... *H01M 10/46* (2013.01); *H01M 10/482* (2013.01); *H01M 10/486* (2013.01); *H02J 7/0016* (2013.01); *H02J 7/0022* (2013.01); *H01M 2010/4271* (2013.01); *H01M 2010/4278* (2013.01); *H02J 7/345* (2013.01); *Y02E 60/13* (2013.01)

(58) Field of Classification Search
USPC ........................................................ 320/112
See application file for complete search history.

(56) References Cited

U.S. PATENT DOCUMENTS

2007/0210746 A1* 9/2007 Tanjou ................. H02J 7/0016
320/112

FOREIGN PATENT DOCUMENTS

| | | | |
|---|---|---|---|
| JP | 2001-283939 | A | 10/2001 |
| JP | 2009-261134 | A | 11/2009 |
| JP | 2011-055702 | A | 3/2011 |
| JP | 2012-079553 | A | 4/2012 |
| JP | 2013-030312 | A | 2/2013 |
| JP | 2013-200966 | A | 10/2013 |

* cited by examiner

STORAGE BATTERY, METHOD OF CONTROLLING STORAGE BATTERY, AND NON-TRANSITORY STORAGE MEDIUM

CROSS-REFERENCE TO RELATED APPLICATIONS

The present application is a national stage application of International Application No. PCT/JP2014/080056 entitled "Storage Battery, Method of Controlling Storage Battery, and Program," filed on Nov. 13, 2014, which claims the benefit of priority from Japanese Patent Application No. JP2013-235979, filed on Nov. 14, 2013, the disclosures of which are incorporated herein in their entirety by reference thereto.

TECHNICAL FIELD

The present invention relates to a storage battery, a method of controlling a storage battery, and a program.

BACKGROUND ART

Patent Document 1 discloses a battery state monitoring system that can be effectively and easily used between battery packs in which the number of battery cells is different in each case. The battery state monitoring system includes a battery state notification unit. The battery state notification unit is provided with a plurality of sub-units each of which corresponds to a predetermined number of battery cells. In addition, each of the sub-units generates battery state information including information, which represents a battery cell state corresponding to the sub-unit on the basis of a cell voltage signal in correspondence with an inter-electrode voltage, and a cell temperature signal in correspondence with a voltage that is output from a temperature sensor unit, and the sub-unit transmits the battery state information to an external apparatus.

Patent Document 2 discloses a battery cell monitoring integrated-circuit capable of obtaining high reliability. The battery cell monitoring integrated-circuit is provided in correspondence with a plurality of battery cells which are electrically connected in series. In addition, the battery cell monitoring integrated-circuit includes a signal input terminal through which a one-bit signal in a high level or a low level is input, a signal output terminal through which a one-bit signal in a high level or a low level is output, and a unit that detects whether or not over-charging or over-discharging is present in the plurality of battery cells. In addition, in a case where abnormality of over-charging or over-discharging is present in the plurality of battery cells, a one-bit signal representing the abnormality is output from the signal output terminal.

Patent Document 3 discloses a voltage equalizer that equalizes a voltage between both ends of each electrical storage device of an assembled electrical storage apparatus in which a plurality of single electrical storage devices are connected in series. The voltage equalizer includes a plurality of voltage regulation units which include a pair of terminals, and which charge or discharge a plurality of electrical storage devices connected in series between the terminals, and a control unit that controls the plurality of voltage regulation units. At least one terminal of each voltage regulation unit is connected to a connection point of the electrical storage devices which are connected in series, and one terminal of one or a plurality of other voltage regulation units is connected between the pair of terminals with one or a plurality of the electrical storage devices interposed therebetween.

Patent Document 4 discloses a battery charging apparatus that is capable of accurately detecting a completely charged state of a battery, and is capable of detecting a kind of a battery pack. The battery charging apparatus includes a charging control unit, a charging rate control unit, and a charging mode selection unit. The charging control unit outputs a charging enable signal, which is based on a battery temperature signal, a battery kind signal, a battery voltage signal, and an output from a voltage division unit, to a charging current control unit, and outputs a charging control signal configured to control a charging rate of a battery pack, a mode control signal configured to allow the charging current control unit to operate in any one of a constant-current charging mode and a constant-voltage charging mode in accordance with the kind of the battery pack, and a charging current compensation signal that makes the amount of a charging current and the amount of a reference current equal to each other. The charging rate control unit regulates a signal of a control terminal in accordance with the charging control signal so as to control the charging rate. The charging mode selection unit selectively outputs a constant-voltage control signal to the control terminal by using the mode control signal.

RELATED DOCUMENT

Patent Document

[Patent Document 1] Japanese Unexamined Patent Application Publication No. 2013-30312
[Patent Document 2] Japanese Unexamined Patent Application Publication No. 2011-55702
[Patent Document 3] Japanese Unexamined Patent Application Publication No. 2009-261134
[Patent Document 4] Japanese Unexamined Patent Application Publication No. 10-136578

SUMMARY OF THE INVENTION

Technical Problem

In a storage battery in which a plurality of battery cells are connected in series and/or in parallel, a difference in temperature may occur between the plurality of battery cells. The difference in temperature may be caused by various reasons, and examples thereof include (1) a stacked state of respective battery cells or respective battery modules, (2) the position of the respective battery cells or the respective battery modules with respect to a frame of which a temperature may be locally different in accordance with an external environment, (3) the position of the respective battery cells or the respective battery modules with respect to a power converter (AC/DC, DC/DC) and the like which generates heat, (4) a variation in performance of the respective battery cells, and the like.

In a case where a difference in temperature occurs between the battery cells, various problems may be caused. For example, when a difference in temperature occurs between battery cells, a difference in internal resistance occurs between the battery cells due to the difference in temperature. In addition, in a state in which the difference in internal resistance occurs, in a case where discharging is performed from a plurality of battery cells, which are connected in series, in the same way, that is, in a case where the same amount of current is extracted from each of the plurality of battery cells, a difference in voltage drop occurs between the battery cells due to the difference in the internal resistance. As a result, a difference in the amount of charged power occurs between the battery cells (a so-called cell balance collapsed state).

In addition, in a state in which the difference in the internal resistance occurs between the battery cells, in a case where a plurality of battery cells, which are connected in series, are charged in the same way, that is, in a case where the same amount of voltage is applied to each of the plurality of battery cells so as to allow a current to flow thereto, a difference in an effective charged amount occurs between the battery cells due to the difference in the internal resistance. As a result, a difference in the amount of charged power occurs between the battery cells.

Furthermore, the above-described problem in which the cell balance collapses is illustrative only, and when a difference in temperature occurs between the battery cells, other various problems may be caused.

An object of the invention is to provide means for reducing a difference in temperature between battery cells.

Solution to Problem

According to an aspect of the invention, there is provided a storage battery including an electrical storage unit including a battery cell group having a plurality of battery cells connected in series, a temperature difference detection unit that detects a difference in temperature between the plurality of battery cells, and a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

In addition, according to another aspect of the invention, there is provided a method of controlling a storage battery including an electrical storage unit including a battery cell group having a plurality of battery cells connected in series. The method includes a temperature difference detection step of detecting a difference in temperature between the plurality of battery cells, and a charging and discharging control step of executing control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

In addition, according to still another aspect of the invention, there is provided a program for a storage battery including an electrical storage unit including a battery cell group having a plurality of battery cells connected in series. The program allows a computer to function as a temperature difference detection unit that detects a difference in temperature between the plurality of battery cells, and a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

Advantageous Effects of Invention

According to the invention, means for reducing a difference in temperature between battery cells is realized.

BRIEF DESCRIPTION OF THE DRAWINGS

The above and other objects, advantages and features of the present invention will be more apparent from the following description of certain preferred exemplary embodiments taken in conjunction with the accompanying drawings.

DESCRIPTION OF EXEMPLARY EMBODIMENTS

Figure 1:
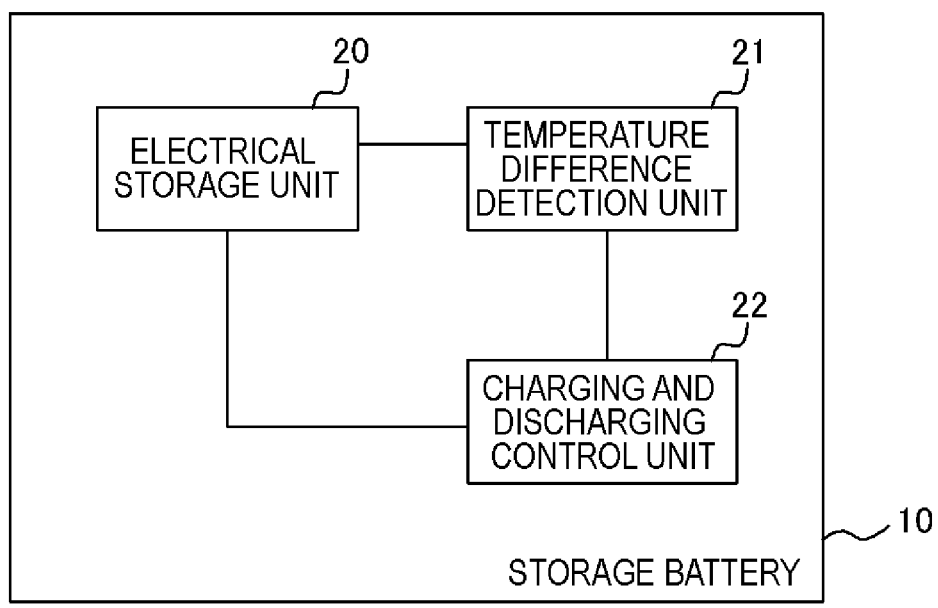
FIG. 1 is a view illustrating an example of a functional block diagram of a storage battery 10 of this exemplary embodiment.

Hereinafter, exemplary embodiments of the invention will be described with reference to the accompanying drawings. Furthermore, the same reference numerals will be given to the same constituent elements, and description thereof will be appropriately omitted.

A storage battery of the exemplary embodiments is realized by an arbitrary combination of hardware and software of an arbitrary computer which mainly include a central processing unit (CPU), a memory, a program that is loaded on the memory (including a program that is downloaded from a storage medium such as a compact disc (CD), or a server on the Internet, and a program that is stored in advance in the memory from a shipping stage of an apparatus), a storage unit such as a hard disk that stores the program, and a network connection interface. In addition, it should be understood by those skilled in the art that various modification examples can be made in methods and devices for realization of the storage battery.

Furthermore, functional block diagrams which are used in the following description of exemplary embodiments represent blocks of a functional unit not a configuration of a hardware unit. In the drawings, respective devices are described to be realized by one apparatus, but realization means thereof is not limited thereto. That is, a physically divided configuration or a logically divided configuration is possible.

First Exemplary Embodiment

FIG. 1 illustrates an example of a functional block diagram of a storage battery 10 of this exemplary embodiment. As illustrated in the drawing, the storage battery 10 includes an electrical storage unit 20, a temperature difference detection unit 21, and a charging and discharging control unit 22.

The electrical storage unit 20 includes a battery cell group having a plurality of battery cells connected in series. Each of the battery cells may be a lithium ion secondary battery cell or a lead storage battery cell. In addition, the battery cell may be a large-capacity capacitor (electric double layer capacitor, a lithium ion capacitor, and the like) cell, and the like. A plurality of battery cells, which are connected in parallel, may be included in the battery cell group. In addition, the electrical storage unit 20 may include a plurality of the battery cell groups. The plurality of battery cell groups are connected to each other in series and/or in parallel. The number of the battery cells which are included in each of the battery cell groups, and the number of the battery cell groups are design factors.

The temperature difference detection unit 21 detects a difference in temperature between the plurality of battery cells. For example, the temperature difference detection unit 21 includes a plurality of temperature sensors which are provided with a predetermined positional relationship with respect to the plurality of battery cells. In addition, the difference in temperature between the plurality of battery cells is detected (calculated) by using data measured by each of the plurality of temperature sensors.

The temperature sensor may be provided in correspondence with each of the plurality of battery cells. In this case, each of the plurality of temperature sensors is provided at a position capable of measuring a temperature of each of the plurality of battery cells. Furthermore, the temperature sensor may be provided for a predetermined number of battery cells. For example, the plurality of battery cells are made into a group by collecting in which a temperature environment (condition capable of having an effect on a temperature of the battery cells) is similar. In addition, each of the plurality of temperature sensors is provided in correspondence with each group. In this case, each of the plurality of temperature sensors is provided at a position capable of measuring a temperature of an arbitrary battery cell (a representative battery cell of each group) in each group. In addition, a temperature measured by the temperature sensor is processed as a temperature of all battery cells included in the group.

The temperature difference detection unit 21 detects the difference in temperature between the plurality of battery cells by using a temperature value measured by each of the plurality of temperature sensors. For example, the temperature difference detection unit 21 creates all pairs which can be created by the plurality of temperature sensors, and calculates a difference in temperature between respective pairs.

The charging and discharging control unit 22 executes control processing of controlling at least one of charging to the electrical storage unit 20 and discharging from the electrical storage unit 20 (excluding self-discharging) so that the amount of current (=current×time) flowing in a battery cell having a relatively low temperature among the plurality of battery cells becomes greater than the amount of current flowing in a battery cell having a relatively high temperature among the plurality of battery cells. Details of the control processing will be described in the following exemplary embodiment.

Next, description will be given of an operational effect of this exemplary embodiment.

The storage battery 10 of this exemplary embodiment performs control so that the amount of current flowing in the battery cell having a relatively low temperature becomes greater than the amount of current flowing in the battery cell having a relatively high temperature in at least one of charging to the electrical storage unit 20 and discharging from the electrical storage unit 20.

During at least one of discharging and charging, when the amount of current flowing a battery cell on a high-temperature side is further reduced in comparison to the amount of current flowing a battery cell on a low-temperature side, an internal resistance loss of the battery cell on a high-temperature side is further reduced in comparison to the battery cell on a low-temperature side, and thus a self-heat generation temperature can be lowered. In this case, a self-heat generation temperature of the battery cell on a low-temperature side further increases than a self-heat generation temperature of the battery cell on a high-temperature side. As a result, a difference in temperature between the battery cells decreases.

As described above, according to this exemplary embodiment, it is possible to decrease the difference in temperature between the plurality of battery cells during processing of at least one of charging to the electrical storage unit 20 and discharging from the electrical storage unit 20.

Second Exemplary Embodiment

In this exemplary embodiment, details of the control processing by the charging and discharging control unit 22 will be described. The other configurations are the same as in the first exemplary embodiment.

Figure 2:
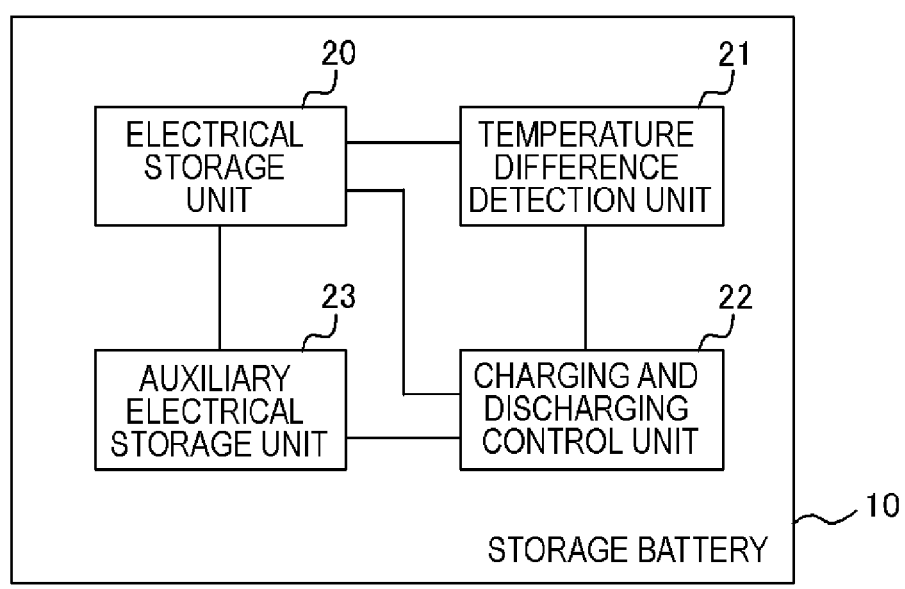
FIG. 2 is a view illustrating an example of a functional block diagram of the storage battery 10 of this exemplary embodiment.

FIG. 2 illustrates an example of a functional block diagram of a storage battery 10 of this exemplary embodiment. As illustrated in the drawing, the storage battery 10 includes an electrical storage unit 20, a temperature difference detection unit 21, a charging and discharging control unit 22, and an auxiliary electrical storage unit 23. Configurations of the electrical storage unit 20 and the temperature difference detection unit 21 are the same as in the first exemplary embodiment. Hereinafter, description will be given of a configuration of the auxiliary electrical storage unit 23, and a configuration of the charging and discharging control unit 22 which is different from that of the first exemplary embodiment.

The auxiliary electrical storage unit 23 has a configuration capable of storing electric power. Examples of the auxiliary electrical storage unit 23 include a DC/DC converter, a capacitor, a secondary battery, and the like. The auxiliary electrical storage unit 23 may be set to have capacity smaller than that of the electrical storage unit 20.

The auxiliary electrical storage unit 23 can be individually connected in parallel to the plurality of battery cells, which are provided to the electrical storage unit 20, by individually controlling (switching) ON/OFF of a plurality of switches (not illustrated). The auxiliary electrical storage unit 23 may be connectable in parallel to a group of a plurality of battery cells, which is a part of the plurality of battery cells provided to the electrical storage unit 20 and which are continuously connected in series, by individually controlling (switching) ON/OFF of a plurality of switches (not illustrated). Furthermore, a plurality of the auxiliary electrical storage units 23 may exist. In addition, the plurality of auxiliary electrical storage units 23 may be individually connected to the battery cells in parallel.

Hereinafter, details of the control processing by the charging and discharging control unit 22 will be described.

Figure 7:
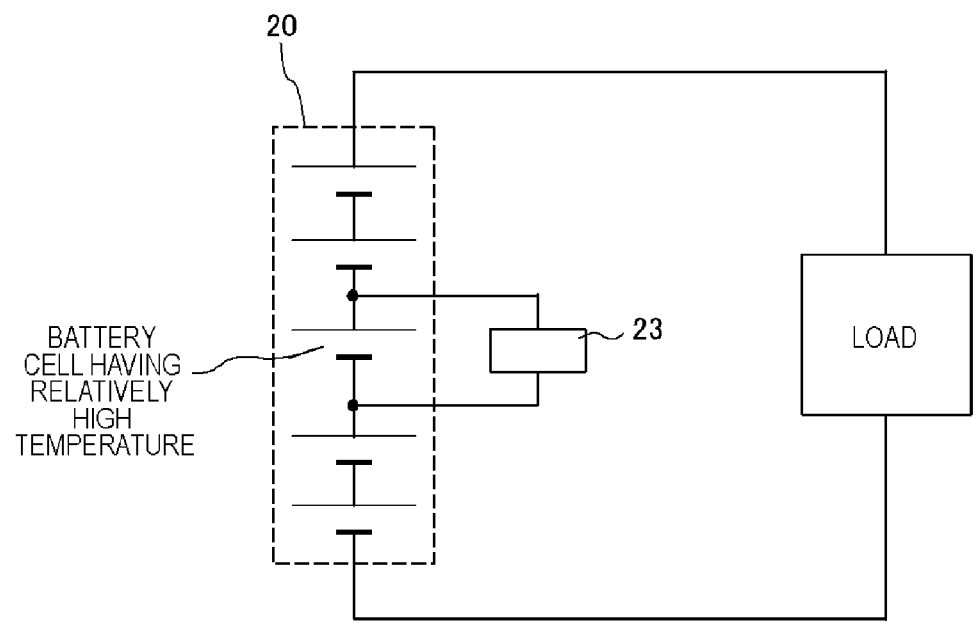
FIG. 7 is a view schematically illustrating a state when a charging and discharging control unit 22 of this exemplary embodiment controls discharging processing.

For example, during discharging from the electrical storage unit 20, the charging and discharging control unit 22 connects the auxiliary electrical storage unit 23 to one or a plurality of battery cells having a relatively high temperature in parallel, and controls discharging from the electrical storage unit 20 and the auxiliary electrical storage unit 23 in the parallel connection state. This state is schematically illustrated in FIG. 7. In this case, a current flowing in a battery cell, to which the auxiliary electrical storage unit 23 is connected in parallel, further decreases in comparison to other battery cells due to power supply from the auxiliary electrical storage unit 23. As a result, during discharging processing, the amount of current flowing in a battery cell having a relatively low temperature becomes greater than the amount of current flowing in a battery cell having a relatively high temperature.

Duration of discharging processing in a state, in which the auxiliary electrical storage unit 23 is connected in parallel to the battery cell having a relatively high temperature, is a design factor. For example, the charging and discharging control unit 22 may monitor a difference in temperature between the battery cell to which the auxiliary electrical storage unit 23 is connected in parallel, and a battery cell (for example, a battery cell in which a temperature is the lowest) as a predetermined comparison target by using a detection result obtained by the temperature difference detection unit 21, and may continue the processing until the difference in temperature becomes a value that is equal to or less than a predetermined value. In addition, the charging and discharging control unit 22 may retain information for determination of the duration of the processing in advance on the basis of the difference in temperature. In addition, the charging and discharging control unit 22 may determine the duration of the processing by using the information. For example, the charging and discharging control unit 22 may search a predetermined table (a table in which the difference in temperature and the duration are correlated to each other) by using the difference in temperature (difference in temperature before execution of the processing) between a battery cell having a relatively high temperature and a predetermined battery cell which is a predetermined comparison target (for example, a battery cell in which a temperature is the lowest) as a key, or may determine the duration by applying the difference in temperature to a predetermined operation expression (an operation expression in which the difference in temperature is set as a variable, and the duration is set as a solution).

Furthermore, in a case where a plurality of the battery cells having a relatively high temperature exist, the charging and discharging control unit 22 can connect the auxiliary electrical storage unit 23 to the plurality of battery cells in parallel. For example, in a configuration in which the plurality of auxiliary electrical storage units 23 exist, each of the plurality of the auxiliary electrical storage units 23 may be connected in parallel to each of the plurality of the battery cells. In addition, the auxiliary electrical storage unit 23 may be sequentially connected in parallel to each of the battery cells with a time interval. In these cases, duration of discharging processing in a state, in which the auxiliary electrical storage unit 23 is connected in parallel to the battery cell, may be different for each battery cell. In addition, in a case where a plurality of the battery cells having a relatively high temperature are continuously connected in series, the auxiliary electrical storage unit 23 may be connected in parallel to a group of the plurality of battery cells.

The other examples of the control processing by the charging and discharging control unit 22 will be described. For example, during charging to the electrical storage unit 20, the charging and discharging control unit 22 controls charging so as to execute processing of supplying electric power supplied from an external power supply to the entirety of the plurality of battery cells which are connected in series, and processing of individually supplying the electric power to the battery cell having a relatively low temperature.

The processing of supplying the electric power to the entirety of the plurality of battery cells which are connected in series represents processing of performing charging by applying the same voltage to the plurality of battery cell, which are connected in series, in the same way so as to allow a current to flow thereto. The processing of individually supplying the electric power to the battery cell having a relatively low temperature represents processing of performing charging by applying a voltage to only the battery cell so as to allow a current to flow thereto. In this case, the amount of current flowing in the battery cell having a relatively low temperature becomes greater than the amount of current flowing in the battery cell having a relatively high temperature in proportion to charging processing that is individually executed.

The sequence, timing, and duration of the two kinds of processing are design factors. One processing may be interrupted by the other processing, and after the one processing is ended, the other processing may be executed.

For example, after executing the processing of individually supplying electric power to the battery cell having a relatively low temperature till a predetermined timing, the processing of supplying electric power to the entirety of the plurality of battery cells, which are connected in series, may be executed. For example, timing of stopping the processing of individually supplying electric power to the battery cell having a relatively low temperature may be timing at which the difference in temperature between the battery cell and a battery cell (for example, a battery cell in which a temperature is the highest) as a predetermined comparison target reaches a value that is equal to or less than a predetermined value. In addition, the charging and discharging control unit 22 may search a predetermined table (a table in which the difference in temperature and the duration are correlated to each other) by using the difference in temperature (difference in temperature before execution of the processing) between respective battery cells and a battery cell (for example, a battery cell in which a temperature is the lowest) as a predetermined comparison target as a key, or may determine the duration by applying the difference in temperature to a predetermined operation expression (an operation expression in which the difference in temperature is set as a variable, and the duration is set as a solution).

With the above processing, the auxiliary electrical storage unit 23 is not necessary. Therefore, the storage battery 10 may be configured as illustrated in FIG. 1. Furthermore, the storage battery 10 may be configured as illustrated in FIG. 2 to supply electric power, in processing of individually supplying electric power to a battery cell having a relatively low temperature, to the battery cell from the auxiliary electrical storage unit 23 instead of the external power supply.

According to this exemplary embodiment, it is possible to realize the same operational effect as in the first exemplary embodiment. In addition, it is possible to realize processing, in which the amount of current flowing in a battery cell having a relatively low temperature becomes greater than the amount of current flowing in a battery cell having a relatively high temperature with a simple configuration using the auxiliary electrical storage unit 23 or an external power supply.

Third Exemplary Embodiment

In a case where a difference in temperature between a first battery cell and a second battery cell among a plurality of battery cells becomes equal to or more than a predetermined value, a storage battery 10 of this exemplary embodiment executes the above-described control processing by setting at least one of the first battery cell and the second battery cell as a target to be processed. Specifically, in a case of controlling discharging processing, a battery cell having a relatively high temperature is set as the target to be processed, and discharging is controlled in a state in which the auxiliary electrical storage unit 23 is connected to the battery cell in parallel. On the other hand, in a case of controlling charging processing, a battery cell having a relatively low temperature is set as the target to be processed, and control is performed to execute processing of individually charging the battery cell. Furthermore, the other configurations are the same as in the first and second exemplary embodiments.

Figure 3:
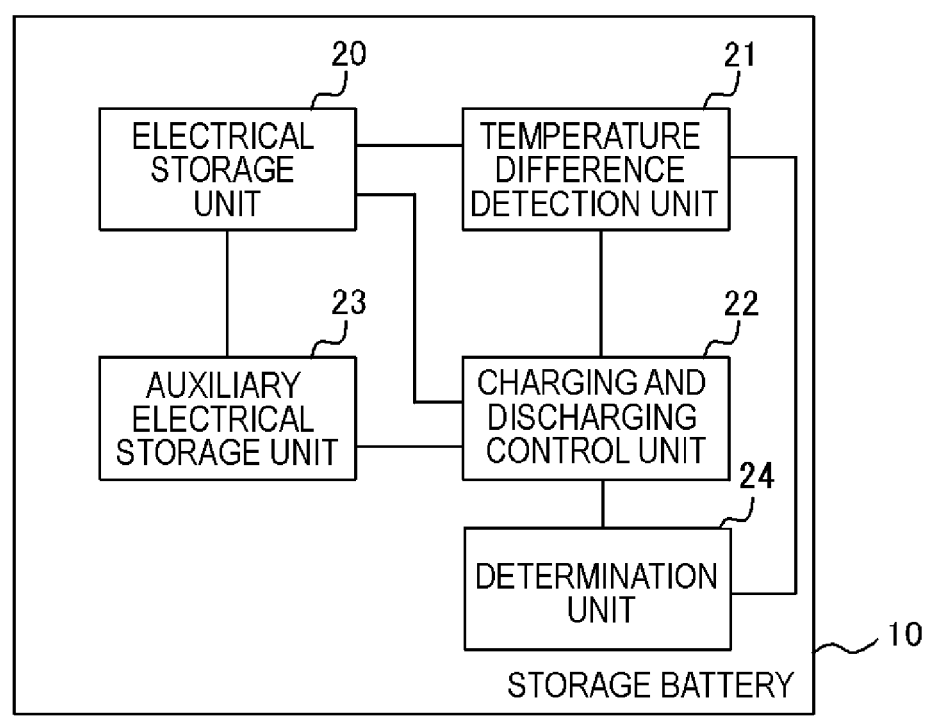
FIG. 3 is a view illustrating an example of a functional block diagram of the storage battery 10 of this exemplary embodiment.

FIG. 3 illustrates an example of a functional block diagram of the storage battery 10 of this exemplary embodiment. As illustrated in the drawing, the storage battery 10 includes an electrical storage unit 20, a temperature difference detection unit 21, a charging and discharging control unit 22, an auxiliary electrical storage unit 23, and a determination unit 24. Furthermore, a configuration, in which the auxiliary electrical storage unit 23 is not provided, may be employed.

Configurations of the electrical storage unit 20, the temperature difference detection unit 21, and the auxiliary electrical storage unit 23 are the same as in the first and second exemplary embodiments. Hereinafter, description will be given of a configuration of the determination unit 24, and a configuration of the charging and discharging control unit 22 which is different from that of the first and second exemplary embodiments.

The determination unit 24 determines whether or not a difference in temperature between battery cells is equal to or more than a predetermined value. That is, the determination unit 24 performs magnitude comparison between a difference in temperature between battery cells which is detected by the temperature difference detection unit 21, and a predetermined value that is retained in advance, and determines whether or not the difference in temperature is equal to or more than the predetermined value.

When the difference in temperature is determined as being equal to or more than the predetermined value, the charging and discharging control unit 22 executes (initiates) control processing of controlling at least one of charging to the electrical storage unit 20 and discharging from the electrical storage unit 20 so that the amount of current flowing in the battery cell having a relatively low temperature becomes greater than the amount of current flowing in the battery cell having a relatively high temperature. That is, in a case of controlling discharging processing, the battery cell having a relatively high temperature is set as a target to be processed, and discharging is controlled in a state in which the auxiliary electrical storage unit 23 is connected to the battery cell in parallel. On the other hand, in a case of controlling charging processing, the battery cell having a relatively low tempera-ture is set as a target to be processed, and control is performed to execute processing of individually charging the battery cell.

According to this exemplary embodiment, it is possible to realize the same operational effect as in the first and second exemplary embodiments. In addition, the above-described control processing can be set to be executed only in a case where the difference in temperature between battery cells becomes greater than a predetermined level. In addition, the above-described control processing can be set to be executed by setting only a battery cell, in which the difference in temperature between battery cells becomes greater than a predetermined level, as a target to be processed. As a result, it is possible to reduce an inconvenience in which unnecessary control processing is executed.

Fourth Exemplary Embodiment

In this exemplary embodiment, description will be given of a specific example of the storage battery 10 of the first to third exemplary embodiments.

Figure 4:
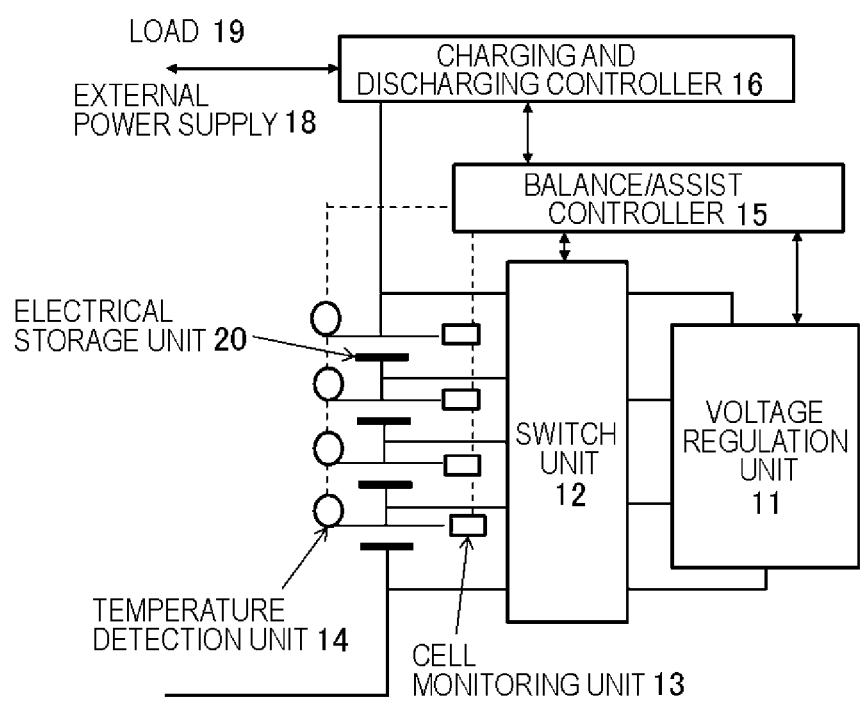
FIG. 4 is a view illustrating an example of a functional block diagram of the storage battery 10 of this exemplary embodiment.

FIG. 4 illustrates an example of a functional block diagram of the storage battery 10 of this exemplary embodiment. As illustrated in the drawing, the storage battery 10 of this exemplary embodiment includes a voltage regulation unit 11, a switch unit 12, a cell monitoring unit 13, a temperature detection unit 14, a balance/assist controller 15, a charging and discharging controller 16, and an electrical storage unit 20. The temperature difference detection unit 21 described in the first to third exemplary embodiments is realized by the temperature detection unit 14 and the balance/assist controller 15. The charging and discharging control unit 22 is realized by the balance/assist controller 15. The auxiliary electrical storage unit 23 is realized by the voltage regulation unit 11. The determination unit 24 is realized by the balance/assist controller 15.

The electrical storage unit 20 of this exemplary embodiment corresponds to the electrical storage unit 20 described in the first to third exemplary embodiments. The electrical storage unit 20 illustrated in the drawing includes four battery cells which are connected in series.

The voltage regulation unit 11 is configured to perform voltage regulation between battery cells. Examples of the voltage regulation unit 11 include a DC/DC converter, a capacitor, and the like.

The switch unit 12 is configured to select a single battery cell or a group of a plurality of battery cells which are continuously connected in series, and is controlled by the balance/assist controller 15.

The temperature detection unit 14 may be an arbitrary unit as long as the unit is a typical temperature sensor. In a case of the example illustrated in the drawing, the temperature detection unit 14 (temperature sensor) is provided in correspondence with each of the plurality of battery cells. Furthermore, in a case where the number of the battery cells is large, the temperature detection unit 14 (temperature sensor) may be provided for a predetermined number of battery cells as described in the first exemplary embodiment. Data (temperature) detected by the temperature detection unit 14 is input to the balance/assist controller 15.

The cell monitoring unit 13 monitors a state of each of the battery cells. For example, the cell monitoring unit 13 can detect a cell voltage (charged voltage) of the battery cell. The cell monitoring unit 13 input data, which represents the state of each of the battery cells, to the balance/assist controller 15.

The charging and discharging controller 16 controls initiation/stopping of discharging from the electrical storage unit 20 to a load 19, and charging from an external power supply 18 to the electrical storage unit 20 on the basis of charging and discharging permission/prohibition information that is generated by the balance/assist controller 15.

The balance/assist controller 15 performs control to execute the control processing by the charging and discharging control unit 22, which is described in the first to third exemplary embodiments, on the basis of the data that is input from the temperature detection unit 14 and the cell monitoring unit 13. For example, the balance/assist controller 15 may control the voltage regulation unit 11, the switch unit 12, and the charging and discharging controller 16 so as to allow the control processing by the charging and discharging control unit 22 to be executed. In addition, the balance/assist controller 15 may perform control to execute balance processing of decreasing a difference in the amount of charged power between a plurality of battery cells. The balance processing may be an active type or a passive type. For example, the balance/assist controller 15 may control the voltage regulation unit 11 and the switch unit 12 to execute the balance processing.

Figure 5:
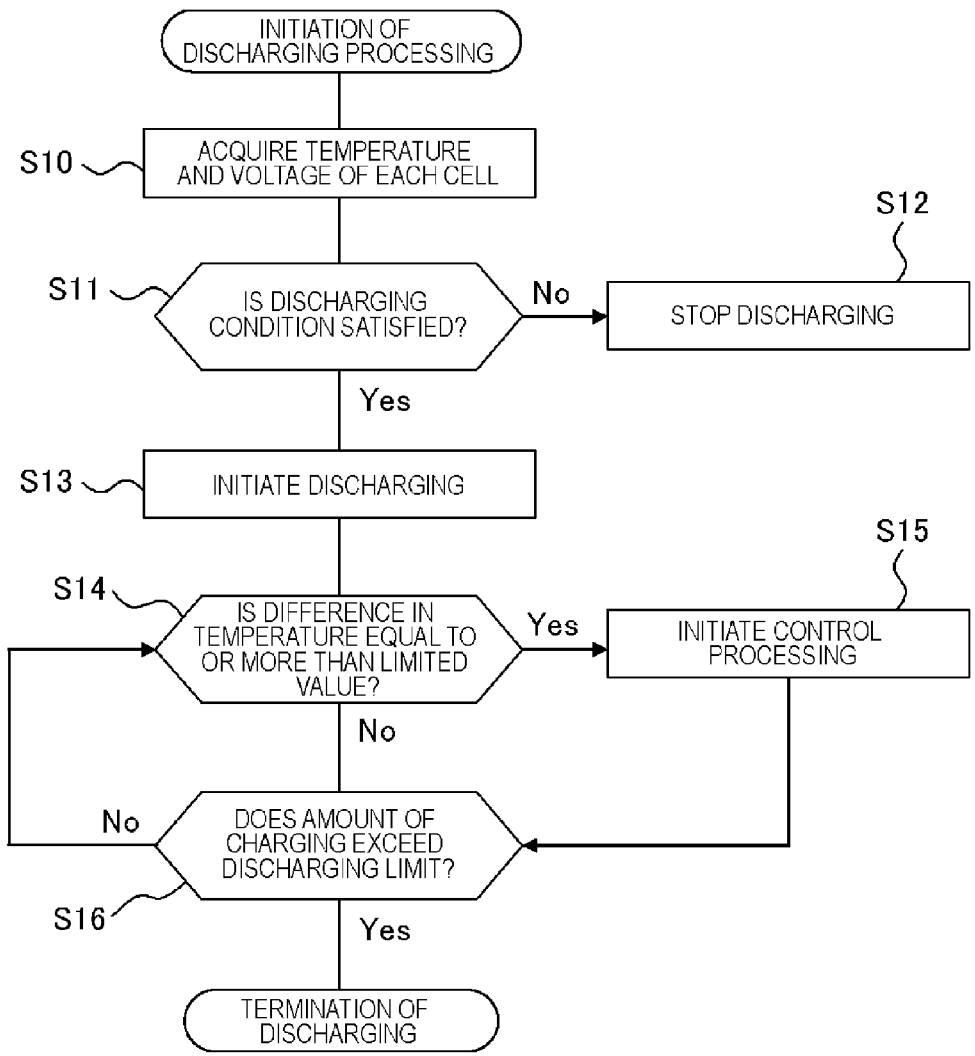
FIG. 5 is a flowchart illustrating an example of a processing flow of the storage battery 10 of this exemplary embodiment.

Next, an example of a processing flow in the storage battery 10 of this exemplary embodiment will be described with reference to a flowchart in FIG. 5. Furthermore, description will be given of a case where as the voltage regulation unit 11, a bidirectional DC/DC converter corresponding to the active balance type is used as an example. The DC/DC converter is an up-down converter that has a function of lowering a voltage from the entire voltage of batteries connected in series to a constant voltage, and a function opposite to the function.

In a case of initiating discharging processing (refer to FIG. 5), first, the balance/assist controller 15 acquires information, which represents a temperature and a voltage of each of a plurality of battery cells, from the temperature detection unit 14 and the cell monitoring unit 13 (S10). In addition, the balance/assist controller 15 determines whether or not a current state of the storage battery 10 satisfies conditions where discharging is permitted (discharging conditions) on the basis of the information that is acquired (S11). For example, the discharging conditions may be conditions in which the temperature and the voltage of the battery cell are in a predetermined range where discharging is permitted. In a case where the discharging conditions are not satisfied (No in S11), the balance/assist controller 15 makes a determination of stopping the discharging processing (S12). On the other hand, in a case where the discharging conditions are satisfied (Yes in S11), the balance/assist controller 15 allows the processing to proceed to S13.

In S13, the balance/assist controller 15 controls the charging and discharging controller 16 so as to initiate discharging processing from the electrical storage unit 20. In addition, the balance/assist controller 15 determines whether or not the difference in temperature between the battery cells is equal to or more than a predetermined value (limited value) (S14). In a case where the difference in temperature is equal to or more than the predetermined value (Yes in S14), the balance/assist controller 15 executes control processing by the charging and discharging control unit 22 as described in the first to third exemplary embodiments (S15). In a case where the difference in temperature is not equal to or more than the predetermined value (No in S14), the balance/assist controller 15 allows the processing to proceed to S16.

In S15, the balance/assist controller 15 performs switching of a switch of the switch unit 12 to connect the DC/DC converter (the voltage regulation unit 11) in parallel to, for example, a battery cell in which a temperature is the highest. In addition, discharging from the electrical storage unit 20 to the load 19 is continued in the parallel connection state. For example, electric power is supplied from a plurality of battery cells provided in the electrical storage unit 20, for example, from battery cells having more amount of charging than other battery cells to the DC/DC converter (the voltage regulation unit 11), and the electric power is stored therein. During discharging, electric power is also supplied from the DC/DC converter (the voltage regulation unit 11). In this case, a current flowing in a battery cell, to which the DC/DC converter (the voltage regulation unit 11) is connected in parallel, decreases, and thus temperature rising in the battery cell due to internal resistance is suppressed. As a result, the difference in temperature between the battery and other battery cells decreases.

In a case where two or more battery cells, in which a temperature is higher in comparison to other battery cells, exist, during discharging, the DC/DC converter (the voltage regulation unit 11) is sequentially connected in parallel to the plurality of battery cells with a time interval. Furthermore, time (duration) for which the DC/DC converter (the voltage regulation unit 11) is connected to each of the battery cells can be adjusted in accordance with a temperature of each of the battery cells. That is, the DC/DC converter (the voltage regulation unit 11) may be connected to a battery cell having a relatively high temperature for a relatively long period of time.

In S16, the balance/assist controller 15 determines whether or not the amount of charging in the electrical storage unit 20 exceeds a discharging limit (whether or not the amount of charging is less than the discharging limit). In a case where the amount of charging does not exceed the discharging limit (No in S16), the balance/assist controller 15 continues the discharging processing, and continues determination in S14 and S16. In a case where the amount of charging exceeds the discharging limit (Yes in S16), the balance/assist controller 15 terminates the discharging processing. Thereafter, the balance/assist controller 15 can execute charging processing to the electrical storage unit 20 at a predetermined timing.

In a case of charging, electric power supplied from the external power supply 18 is supplied to the entirety of the plurality of battery cells, and electric power from the DC/DC converter (the voltage regulation unit 11) is individually and positively supplied to a battery cell in which a temperature is low. The electric power may be individually supplied from the external power supply 18 to the battery cell in which a temperature is low. During discharging, the amount of discharging from the battery cell having a relatively high temperature becomes smaller than the amount of discharging from the battery cell having a relatively low temperature due to connection of the DC/DC converter (the voltage regulation unit 11). As a result, at the time of terminating discharging (before charging processing), the amount of charging in the battery cell having a relatively high temperature becomes greater than the amount of charging in the battery cell having a relatively low temperature. In charging, it is possible to reduce a difference in the amount of charging by positively supplying electric power to the battery cell in which a temperature is low.

Furthermore, the balance/assist controller 15 may control the switch unit 12 and the voltage regulation unit 11 at an appropriate timing so as to execute balance processing (processing of reducing a difference in the amount of charging) of the plurality of battery cells provided to the electrical storage unit 20.

Figure 6:
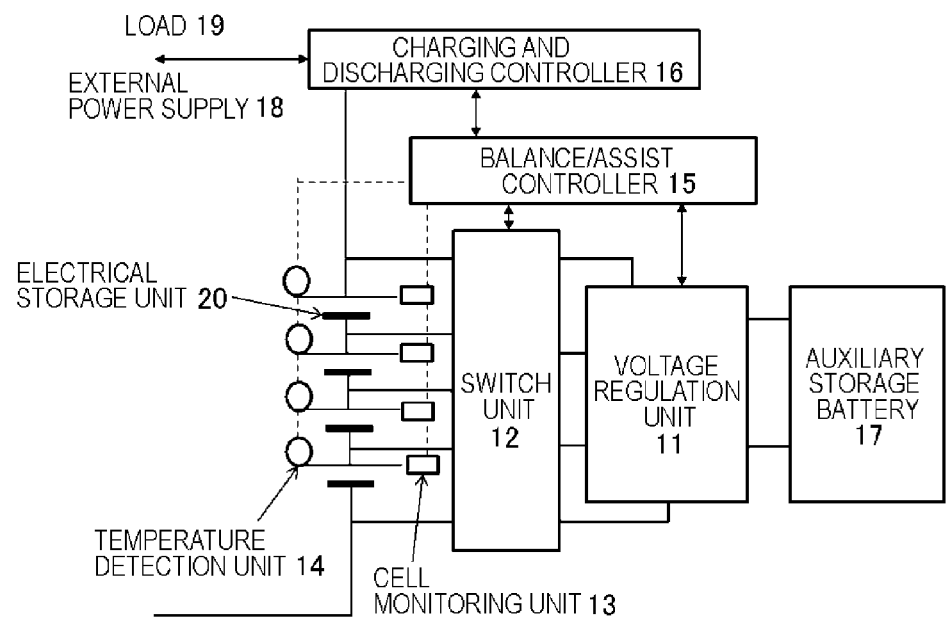
FIG. 6 is a view illustrating an example of a functional block diagram of the storage battery 10 of this exemplary embodiment.

FIG. 6 illustrates another specific example of this exemplary embodiment. Specifically, an auxiliary storage battery 17 is further provided. Examples of the auxiliary storage battery 17 include a capacitor, a secondary battery, and the like. In a case of this example, the auxiliary electrical storage unit 23 described in the first to third exemplary embodiments is realized by the voltage regulation unit 11 and/or the auxiliary storage battery 17. The auxiliary storage battery 17 has a roll of protecting over-charging and over-discharging of the battery cells, and also performs an intermediate charge retaining function during execution of the active balance type. Accordingly, it is preferable that a storage battery that constitutes the auxiliary storage battery 17 has characteristics capable of performing charging and discharging in a wide operating temperature range, and is excellent in charging and discharging cycle characteristics (long cycle life).

According to this exemplary embodiment described above, the same operational effect as in the first to third exemplary embodiments is realized. In addition, a specific example of realizing the storage battery 10 according to the first to third exemplary embodiments is provided.

Hereinafter, examples of reference aspects will be additionally stated.

1. A storage battery including:

an electrical storage unit including a battery cell group having a plurality of battery cells connected in series;

a temperature difference detection unit that detects a difference in temperature between the plurality of battery cells; and a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

2. The storage battery according to 1, further including an auxiliary electrical storage unit capable of storing electric power, wherein the charging and discharging control unit connects the auxiliary electrical storage unit to the battery cell having a relatively high temperature in parallel, and controls discharging from the electrical storage unit so that discharging is performed from the electrical storage unit and the auxiliary electrical storage unit in a state of the parallel connection.

3. The storage battery according to 1 or 2, wherein the charging and discharging control unit controls charging to the electrical storage unit so as to execute processing of supplying electric power supplied from an external power supply to the entirety of the plurality of battery cells which are connected in series, and processing of individually supplying the electric power to the battery cell having a relatively low temperature.

4. The storage battery according to 1 or 2, further including an auxiliary electrical storage unit capable of storing electric power, wherein the charging and discharging control unit controls charging to the electrical storage unit so as to execute processing of supplying electric power supplied from an external power supply to the entirety of the plurality of battery cells which are connected in series, and processing of individually supplying electric power stored in the auxiliary electrical storage unit to the battery cell having a relatively low temperature.

5. The storage battery according to any one of 1 to 4, further including a determination unit that determines whether or not the difference in temperature is equal to or more than a predetermined value, wherein when the difference in temperature is determined as being equal to or more than the predetermined value, the charging and discharging control unit executes the control processing in accordance with the determination result.

6. A method of controlling a storage battery including an electrical storage unit including a battery cell group having a plurality of battery cells connected in series, the method including:

a temperature difference detection step of detecting a difference in temperature between the plurality of battery cells; and a charging and discharging control step of executing control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

6-2. The method of controlling a storage battery according to 6, wherein the storage battery further includes an auxiliary electrical storage unit capable of storing electric power, in the charging and discharging control step, the auxiliary electrical storage unit is connected to the battery cell having a relatively high temperature in parallel, and discharging from the electrical storage unit is controlled so that discharging is performed from the electrical storage unit and the auxiliary electrical storage unit in a state of the parallel connection.

6-3. The method of controlling a storage battery according to 6 or 6-2, wherein in the charging and discharging control step, charging to the electrical storage unit is controlled so as to execute processing of supplying electric power supplied from an external power supply to the entirety of the plurality of battery cells which are connected in series, and processing of individually supplying the electric power to the battery cell having a relatively low temperature.

6-4. The method of controlling a storage battery according to 6 or 6-2, wherein the storage battery further includes an auxiliary electrical storage unit capable of storing electric power, in the charging and discharging control step, charging to the electrical storage unit is controlled so as to execute processing of supplying electric power supplied from an external power supply to the entirety of the plurality of battery cells which are connected in series, and processing of individually supplying electric power stored in the auxiliary electrical storage unit to the battery cell having a relatively low temperature.

6-5. The method of controlling a storage battery according to any one of 6 to 6-4, further including a determination step of determining whether or not the difference in temperature is equal to or more than a predetermined value, wherein in the charging and discharging control step, when the difference in temperature is determined as being equal to or more than the predetermined value, the control processing is executed in accordance with the determination result.

7. A program for a storage battery including an electrical storage unit including a battery cell group in which a plurality of battery cells are connected in series, the program allowing a computer to function as:
    a temperature difference detection unit that detects a difference in temperature between the plurality of battery cells; and
    a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells.

7-2. The program according to 7,
    wherein the storage battery further includes an auxiliary electrical storage unit capable of storing electric power, and
    the charging and discharging control unit is allowed to connect the auxiliary electrical storage unit to the battery cell having a relatively high temperature in parallel, and is allowed to control discharging from the electrical storage unit so that discharging is performed from the electrical storage unit and the auxiliary electrical storage unit in a state of the parallel connection.

7-3. The program according to 7 or 7-2,
    wherein the charging and discharging control unit is allowed to control charging to the electrical storage unit so as to execute processing of supplying electric power supplied from an external power supply to the entirety of the plurality of battery cells which are connected in series, and processing of individually supplying the electric power to the battery cell having a relatively low temperature.

7-4. The program according to 7 or 7-2,
    wherein the storage battery further includes an auxiliary electrical storage unit capable of storing electric power, and
    the charging and discharging control unit is allowed to control charging to the electrical storage unit so as to execute processing of supplying electric power supplied from an external power supply to the entirety of the plurality of battery cells which are connected in series, and processing of individually supplying electric power stored in the auxiliary electrical storage unit to the battery cell having a relatively low temperature.

7-5. The program according to anyone of 7 to 7-4,
    wherein the computer is further allowed to function as a determination unit that determines whether or not the difference in temperature is equal to or more than a predetermined value, and
    when the difference in temperature is determined as being equal to or more than the predetermined value, the charging and discharging control unit is allowed to execute the control processing in accordance with the determination result.

Priority is claimed on Japanese Patent Application No. 2013-235979, filed on Nov. 14, 2013, the content of which is incorporated herein by reference.

The invention claimed is:

1. A storage battery, comprising:
    an electrical storage unit including a battery cell group having a plurality of battery cells connected in series;
    a temperature difference detection unit that detects a difference in temperature between the plurality of battery cells;
    a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells; and
    an auxiliary electrical storage unit capable of storing electric power, wherein the charging and discharging control unit connects the auxiliary electrical storage unit to the battery cell having a relatively high temperature in parallel, and controls discharging from the electrical storage unit so that discharging is performed from the electrical storage unit and the auxiliary electrical storage unit in a state of the parallel connection.

2. The storage battery according to claim 1,
    wherein the charging and discharging control unit controls charging to the electrical storage unit so as to execute processing of supplying electric power supplied from an external power supply to an entirety of the plurality of battery cells which are connected in series, and processing of individually supplying the electric power to the battery cell having a relatively low temperature.

3. The storage battery according to claim 1,
    wherein the charging and discharging control unit controls charging to the electrical storage unit so as to execute processing of supplying electric power supplied from an external power supply to the entirety of the plurality of battery cells which are connected in series, and processing of individually supplying electric power stored in the auxiliary electrical storage unit to the battery cell having a relatively low temperature.

4. The storage battery according to claim 1, further comprising a determination unit that determines whether or not the difference in temperature is equal to or more than a predetermined value,
    wherein when the difference in temperature is determined as being equal to or more than the predetermined value, the charging and discharging control unit executes the control processing in accordance with the determination result.

5. The storage battery according to claim 1,
    wherein the charging and discharging control unit does not connect the auxiliary electrical storage nit to the battery cell having a relatively low temperature in parallel.

6. The storage battery according to claim 1,
    wherein the charging and discharging control unit monitors a difference in temperature between the battery cell to which the auxiliary electrical storage unit is connected in parallel and the battery cell to which the auxiliary electrical storage unit is not connected in parallel, and continues discharging from the electrical storage unit and the auxiliary electrical storage unit until the difference in temperature becomes a value that is equal to or less than a predetermined value.

7. The storage battery according to claim 1,
    wherein the charging and discharging control unit determines duration of discharging on the basis of the difference in temperature between the battery cell having a relatively high temperature and the battery cell having a relatively low temperature.

8. A method of controlling a storage battery including an electrical storage unit including a battery cell group having a plurality of battery cells connected in series, the method comprising:

a temperature difference detection step of detecting a difference in temperature between the plurality of battery cells;

a charging and discharging control step of executing control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells; and a discharging control step of connecting an auxiliary electrical storage capable of storing electric power to the battery cell having a relatively high temperature in parallel, and controlling discharging from the electrical storage unit so that discharging is performed from the electrical storage unit and the auxiliary electrical storage unit in a state of the parallel connection.

9. A non-transitory storage medium storing a program for a storage battery including an electrical storage unit including a battery cell group having a plurality of battery cells connected in series, the program allowing a computer to function as:

a temperature difference detection unit that detects a difference in temperature between the plurality of battery cells;

a charging and discharging control unit that executes control processing of controlling at least one of charging to the electrical storage unit and discharging from the electrical storage unit so that the amount of current flowing in a battery cell having a relatively low temperature among the plurality of battery cells becomes greater than the amount of current flowing in a battery cell having a relatively high temperature among the plurality of battery cells; and an auxiliary electrical storage unit capable of storing electric power, wherein the charging and discharging control unit connects the auxiliary electrical storage unit to the battery cell having a relatively high temperature in parallel, and controls discharging from the electrical storage unit so that discharging is performed from the electrical storage unit and the auxiliary electrical storage unit in a state of the parallel connection.

* * * * *